United States Patent [19]

McLaughlin

[11] 4,365,841
[45] Dec. 28, 1982

[54] GRAVITY DUMP WAGON

[75] Inventor: Bruce I. McLaughlin, Glidden, Iowa

[73] Assignee: Scranton Manufacturing Co., Inc., Scranton, Iowa

[21] Appl. No.: 141,368

[22] Filed: Apr. 18, 1980

[51] Int. Cl.³ .............................................. B60P 1/56
[52] U.S. Cl. .................................. 298/27; 105/282 R; 280/442
[58] Field of Search .............. 298/24, 27, 28; 296/15; 105/282 R, 282 A, 282 P; 280/116, 442, 493, 494

[56] References Cited

U.S. PATENT DOCUMENTS

| 813,807 | 2/1906 | Levak | 105/282 P |
|---|---|---|---|
| 1,807,447 | 5/1931 | Smith | 105/282 R |
| 3,554,576 | 1/1971 | Parker | 298/24 X |
| 3,860,252 | 1/1975 | Martens et al. | 280/442 X |
| 3,938,861 | 2/1976 | Bagwell | 298/27 |
| 4,004,700 | 1/1977 | Empey | 414/144 |
| 4,009,906 | 3/1977 | Sweet et al. | 298/27 |

Primary Examiner—Leslie J. Paperner
Attorney, Agent, or Firm—Henderson & Sturm

[57] ABSTRACT

This invention relates to bottom opening utility wagons in general and more specifically to a gravity dump wagon having a unique hydraulically actuated bottom opening arrangement wherein the closure members translate away from the hopper body in the horizontal plane to reduce the vertical clearance required between the bottom of the hopper and the ground, to effect unobstructed dumping of the wagon contents, the wagon further having a forward axle pivotal in two perpendicular planes.

1 Claim, 5 Drawing Figures

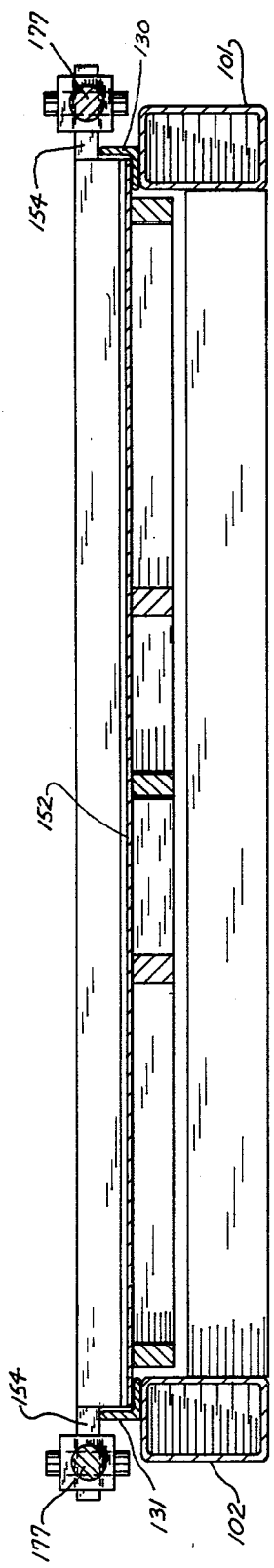
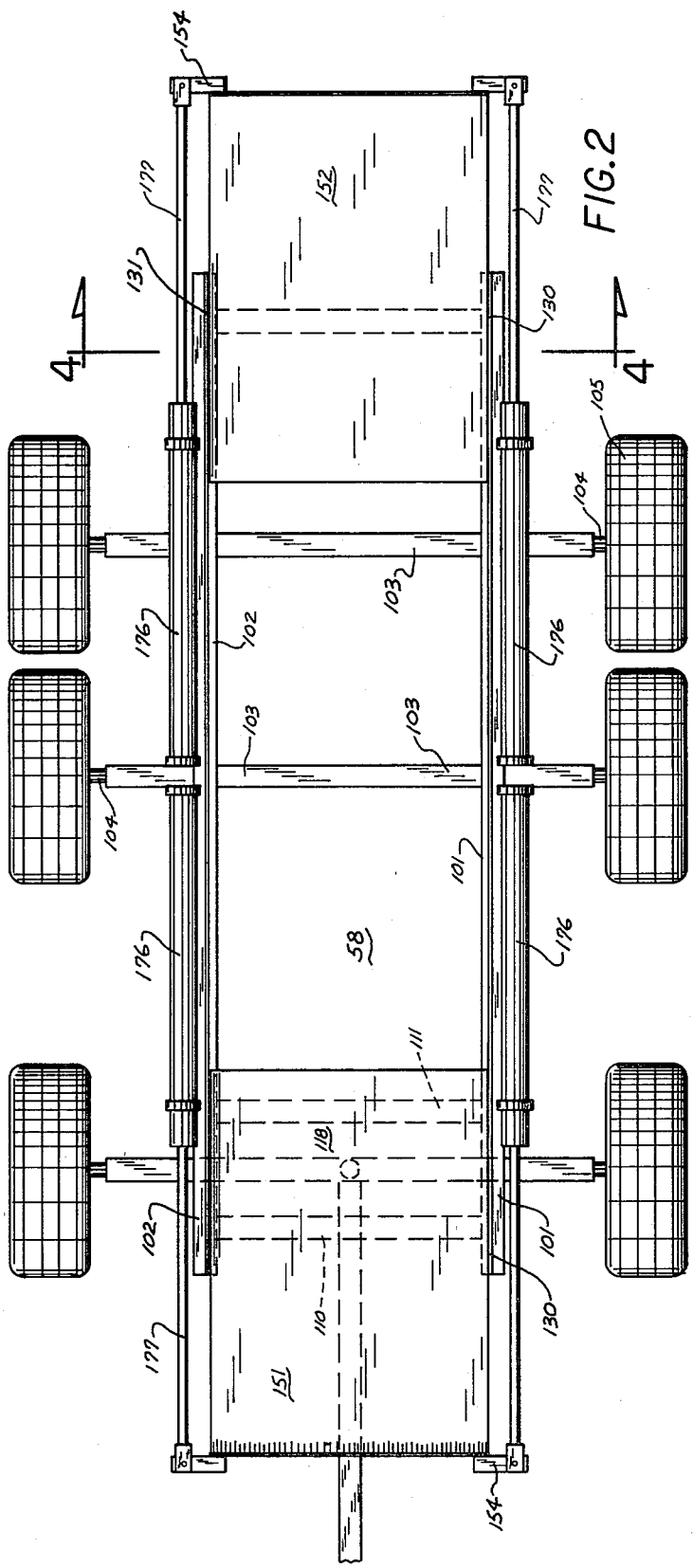

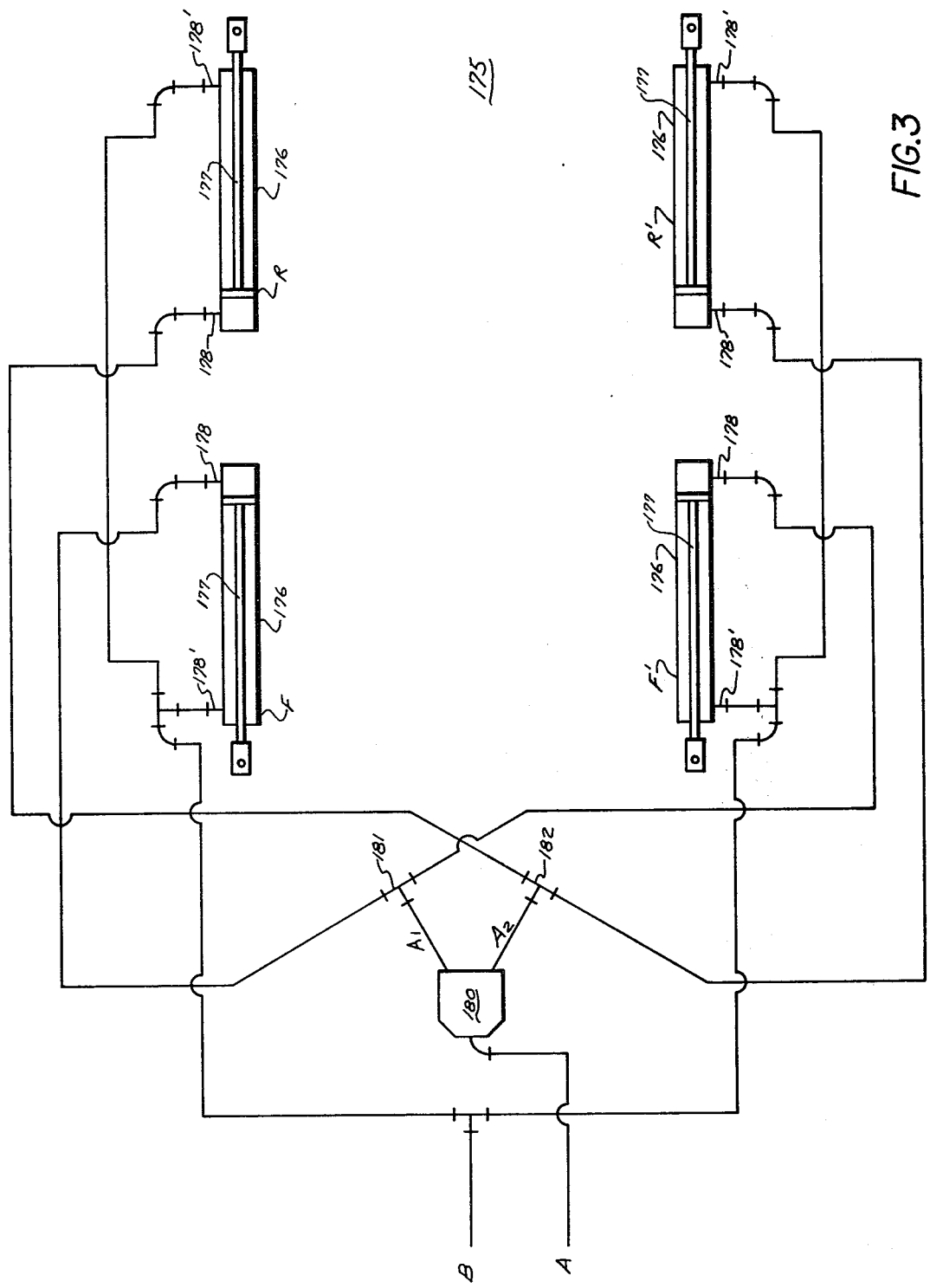

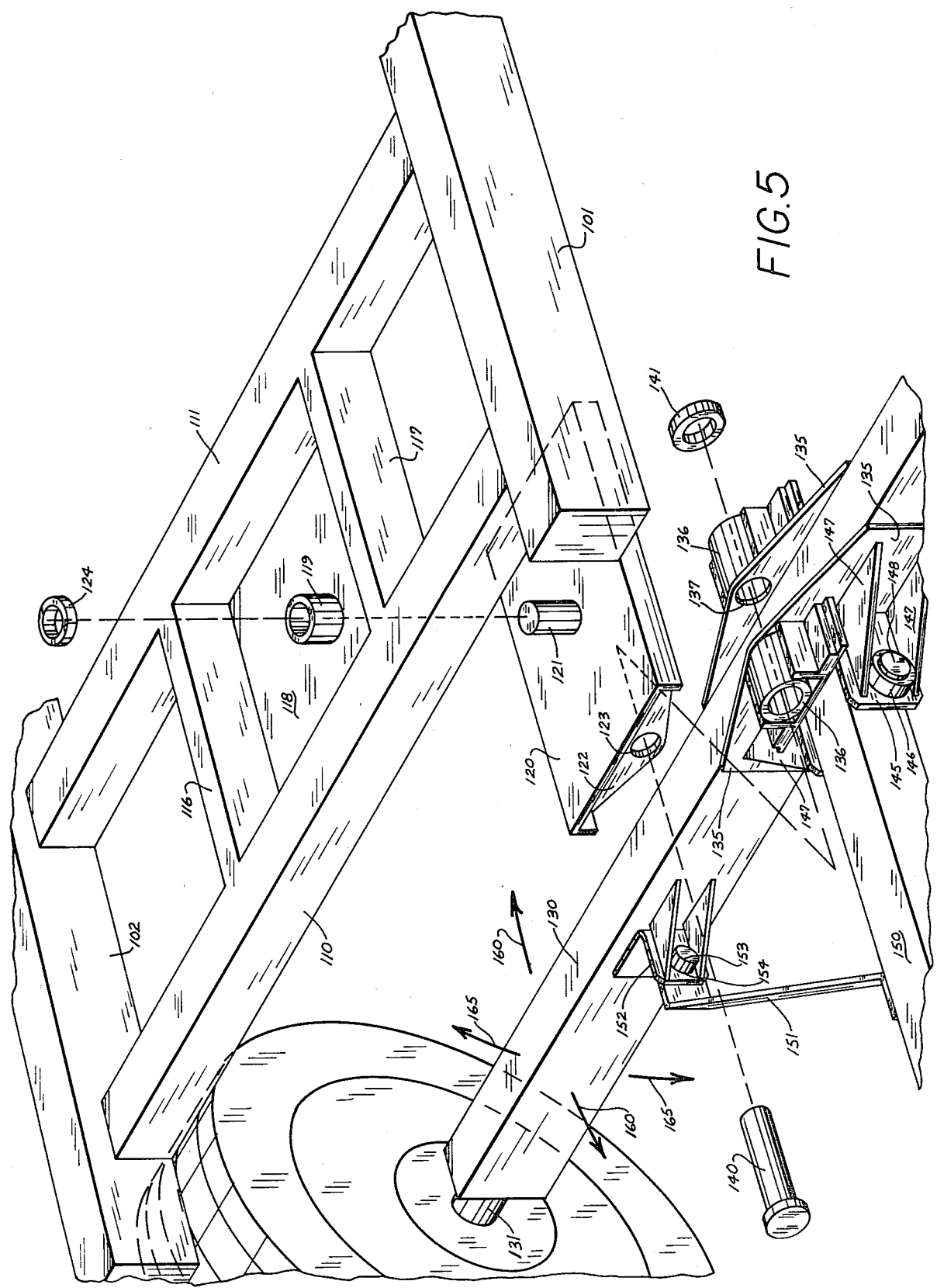

GRAVITY DUMP WAGON

BACKGROUND OF THE INVENTION

Utility wagons have been employed in various industries; however, they have particular applicability to the field of agriculture, and have become an indispensible adjunct to any successful farming operation. Most of the wagons utilized have a large bin or dump box mounted on a wheeled framework and a closure member operatively connected to the bottom or sides of the bin to dump the contents of the bin through the force of gravity. The closure members are normally of the clam-shell variety and dispense the contents of the bin in response to the mechanical, electrical, or hydraulic actuation of the closure members. Examples of such devices may be seen by reference to U.S. Pat. Nos. 2,018,209; 2,077,534; 2,401,407; 2,991,730; and 3,910,635.

There has been a long felt need particularly on large cattle feeder installations for a rugged year-round utility wagon which is adapted to haul silage, corn, manure, gravel dirt, etc., and which provides a dependable, easily controlled, closure actuating mechanism which does not sacrifice stability to provide ample opening clearance for the closure members. Normally, the clearance problem is associated with the pivoted or clam-shell variety closure members, and requires that the bottom of the dump box is positioned a suitable distance above the ground to allow the closure member unobstructed pivoted movement beneath the bin to prevent engagement with the ground. Many wagons in use today have a limited bin capacity due to the height restriction imposed on the wagon by virtue of the elevated position of the bin with respect to the support framework. This height restriction is particularly significant when the wagon is traversing the side of a hill or on uneven terrain and becomes unstable due to the location of the center of gravity with respect to the base.

SUMMARY OF THE INVENTION

An object of the present invention is the provision of an utility wagon which is rugged, durable and designed for year-round usage.

Another object is the provision of an utility wagon which has a low center of gravity, and an unique closure member which allows the wagon body to be built close to the ground.

A further object of the invention is the provision of a hydraulically operated closure member for the wagon dump box which horizontally translates the closure members away from the wagon body.

Still another object of the invention is the provision of a closure member apparatus which permits unobstructed gravity dumping of the wagon's contents without sacrificing the stability of the assembly.

A still further object of the invention is the provision of an utility wagon design which permits the volume of the wagon's dump box to be increased significantly beyond the capacity of clam-shell opening type wagons, while retaining its stability due to a low center of gravity and the provision of a forward axle pivotal in two perpendicular planes.

These and other objects, advantages and novel features of the invention will become apparent from the following detailed description of the invention when considered in conjunction with the accompanying drawings.

BRIEF DESCRIPTION OF THE DRAWINGS

FIG. 2 is a cross-sectional view taken through line 2—2 of FIG. 1 showing the placement of the hydraulic cylinders on the wagon framework.

FIG. 3 is a schematic diagram of the hydraulic controls which actuate the closure members.

FIG. 4 is a detailed view of the closure guideway and the connections between the hydraulic cylinders and the closure members.

FIG. 5 shows a partial perspective view of the forward axle and hitch assembly of the present invention.

DESCRIPTION OF THE PREFERRED EMBODIMENT

Figure 1:
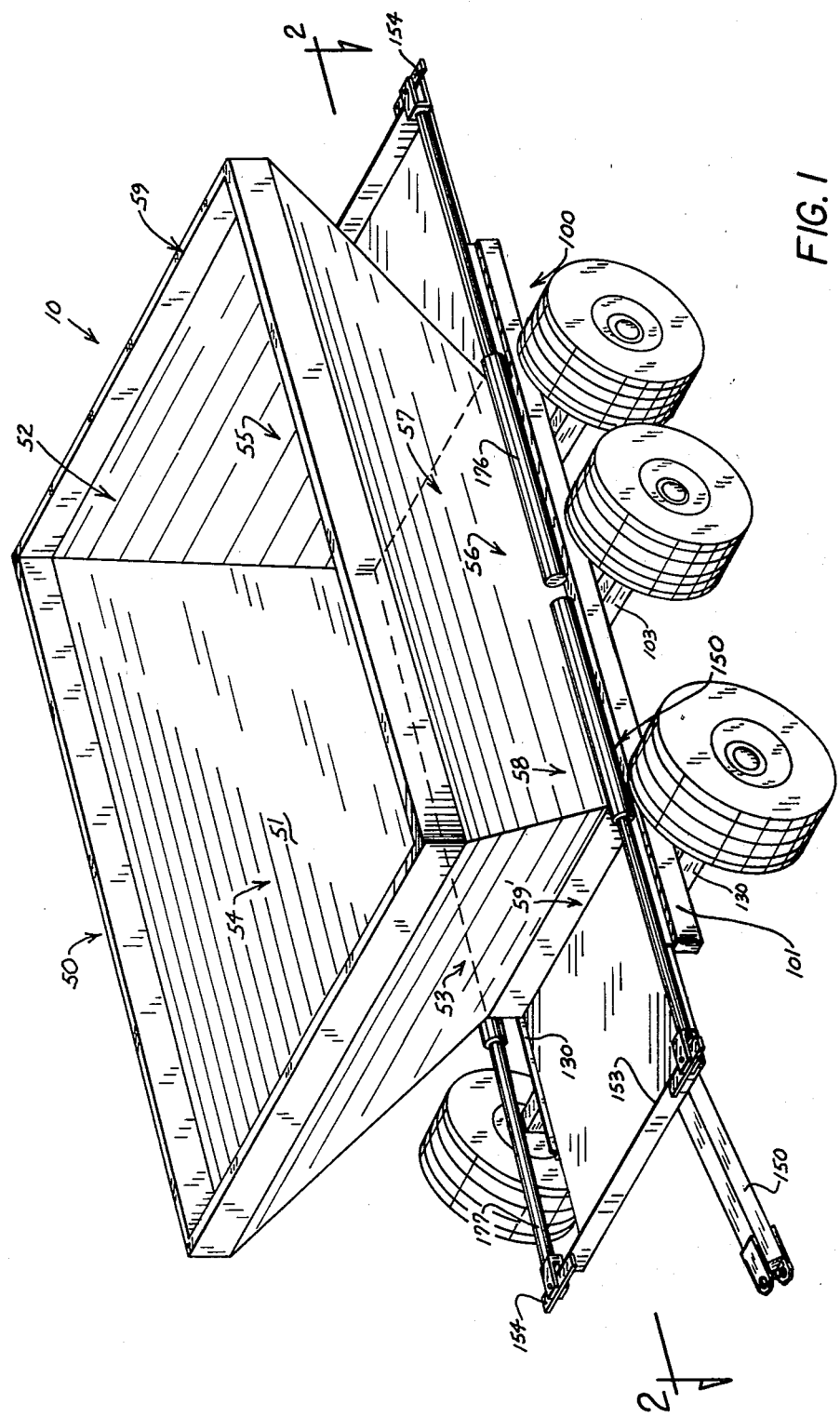
FIG. 1 is a perspective view of the gravity wagon of the instant invention showing the closure members in the fully extended position.

As can be seen by reference to FIG. 1, the utility wagon of the instant invention is designated generally as 10 and comprises a wagon body 50 mounted on a framework 100 which is operatively connected to a closure assembly 150 to control the gravity dispensing of the contents of the wagon.

The wagon body 50 comprises a dump box or bin 51 having an enlarged rectangular opening 52 formed by four trapezoidal members 53, 54, 55 and 56 whose downwardly extending sides converge and form a second smaller rectangular opening 57 which forms the outlet 58 for the dump box 51. The wagon body 50 is fabricated from heavy gauge metal and is constructed to withstand heavy and prolonged use. The trapezoidal sides 53-56 of the bin 51 may be joined together by welding, crimping or any suitable securing method. Each of the trapezoidal sides may also be fabricated from one or more sheets of metal for ease of manufacture. The rectangular openings 52 and 58 may further be provided with rectangular U-shaped channel members 59 and 59' which define the inlet and outlet of the bin 51, provide reinforcement for the bin components, and present a generally more aesthetically pleasing appearance.

The bin 51 is supported on a framework 100 comprising two horizontally disposed parallel elongated beams 101 and 102 which run approximately the width of the rectangular opening 58. The beams 101 and 102 are connected near one end by cross-pieces 103 which contain axles 104 to rotatably support wheels 105.

The beams 101 and 102 are connected at their other end by cross pieces 110, 111. See FIGS. 2 and 5. Cross pieces 110, 111 are, in turn, connected by tie beams 116, 117. An apertured plate 118 is secured along its edges within the rectangular space defined by cross pieces 110, 111, and tie beams 116, 117 as shown in FIG. 5. Plate 118 has an upstanding collar 119 aligned with its centrally disposed aperture.

The apertured plate 118 is cooperatively assembled with the remaining forward axle components to comprise a forward axle assembly moveable in two perpendicular planes as follows:

Horizontal pivot plate 120 has a journal post 121 disposed upward, normally from its center. Journal post 121 is inserted, from below, into the collar 119 of plate 118. The post 121 is secured within collar 119 by a suitable securing means 124 at its upper end so that the upper side of plate 120 is secured in abutment with the under side of plate 118. The journal post 121 and collar 119 are thus secured in pivotal cooperation so that pivot plate 120 is secured pivotally with respect to apertured plate 118.

Pivot plate 120 has downwardly disposed flanges 122 at its forward and rearward ends. (Only the forward flange is shown) The flanges 122 have centrally disposed apertures 123.

Pivot plate 120 is connected to forward axle bearing member 130 in the following way:

Forward axle bearing member 130 rotationally supports forward axle 131. The axle bearing member 130 supports a pair of upstanding bearing flanges 135 centrally secured to its front and rear sides. Each of the bearing flanges 135 supports a bearing 136 above the axle bearing member 130 as shown in FIG. 5. The bearings 136 have hollow interiors of circular cross section which align with apertures 137 in the bearing flanges 135.

Pivot plate 120 is assembled on top of flanges 135, having bearings 136, so that the apertures 123 of the flanges 122 of plate 120 are aligned with the circular interiors of the bearings 136. This alignment having been accomplished, a journal pin 140 is inserted through the apertures 123 and bearings 136 to pivotally connect the forward axle bearing member 130 to pivot plate 120. A suitable securing means 141 is received on the rearward end of journal pin 140 to secure the pin 140 and the pivotal connection between member 130 and plate 120.

The hitch 150 is connected to forward axle member 130 as follows:

Forward upstanding bearing flange 135 supports a pair of normally oriented hitch bearing tabs 145. The tabs 145 support hitch bearings 146 and are supported by gussets 147. The hitch 150 has an aperture (not shown) at its rearward end in alignment with hitch bearings 146. A hitch journal pin 148 is secured within the aligned hitch aperture and bearings 146 to form a pivotal connection between the hitch 150 and forward axle bearing member 130.

Axle bearing member 130 supports a pair of strut flanges 152. Hitch 150 is supported by a pair of stabilizing struts 151. Struts 151 have apertures (not shown) which align with apertures 154 in strut flanges 152 to accommodate pivot pins 153. Pivot pins 153 are suitably secured to form a pivotal connection between the axle bearing member 130 and hitch stabilizing struts 151.

Having, thus, described the structure of the forward axle/hitch assembly its operation can be appreciated. The forward axle bearing member 130 is pivotal in a horizontal plane indicated by arrows 160 by means of the pivotal connection between apertured plate 118 and pivot plate 120. Axle bearing member 130 is additionally pivotal in a vertical plane indicated by arrows 165 by means of the pivotal connection between pivot plate 120 and the flange bearings 136 of axle bearing member 130. Moreover, hitch 150 is pivotally connected to member 130 at its rearward end and by means of stabilizing struts 151 as described. Thus, the instant assembly provides a hitch 150 pivotally secured to a forward axle member 130 which is pivotally moveable in two perpendicular planes. The advantages provided by such a stearing axle assembly become apparent when one considers the rough and uneven terrain which the present wagon could traverse without damage to the front stearing axle, and with a minimized danger of the wagon tipping over in that the forward axle permits the wagon box to remain substantially upright while the dual rear axles provide a stable base for the wagon. The low center of gravity of the wagon further promotes stability as will be later discussed more fully.

Turning now more particularly to the dump box and closure members, the elongated beams 101 and 102 support and are affixed to the sides 54 and 56 of the bin 51 to maintain the bin in an upright position, and dispose the dump box outlet 58 between the beams 101 and 102. Positioned beneath the dump box outlet 58 and operatively connected thereto is a closure assembly 150 comprising a pair of closure members 151 and 152. The closure members 151 and 152 comprise a pair of flat, horizontally disposed, reinforced metal doors which are supported by and suspended between the elongated beams 101 and 102. The closure members are further provided with extensions 154 which allow the doors to be connected to the hydraulic control system 175. The metal doors are mounted flush with the dump box outlet opening, and are disposed in a sliding relationship thereto in that they cooperate slideably with angle strips 130, 131 which are supported by beams 101, 102, respectively, as shown in FIG. 4.

As can be seen by reference to FIGS. 2 and 3, the hydraulic control assembly 175 comprises four double acting hydraulic cylinders 176 which contain an internal piston member (not shown) which is connected to an elongated actuator rod 177. Each of the cylinders 176 is provided with fluid ports 178 and 178' which serve as supply or return ports depending on the direction of the fluid flow in the cylinders.

FIG. 3 illustrates the fluid circuitry employed to open the closure members 151 and 152. The schematic supply line is designated as "A", and the return line is designated as "B". The hydraulic fluid flows through control valve 180 which will subsequently direct the flow to supply line $A^1$ and/or $A^2$. Supply $A^1$ controls the flow through the forward cylinders F and F' via the three-way valve 181 to move the actuator rod 177 in the forward direction, and supply line $A^2$ controls the flow through the rearward cylinders R and R' via the three-way valve 182 to move the actuator rod 177 in the rearward direction. Obviously, when the fluid flow is reversed the supply line becomes the return line and the direction of the actuator rod 177 is reversed.

The hydraulic cylinders 176 are mounted on the elongated beams 101 and 102, and the actuator rods 177 are secured to the extensions 154 on the closure members 151 and 152 so that the cylinders can open and close the dump box outlet by translating the closure members in a horizontal plane towards and away from the wagon body 50 in response to the flow of fluid through the hydraulic control assembly 174.

As can be seen by reference to FIG. 4, the elongated beams 101 and 102 are provided with raised guide or track portions 130 running their entire length to insure that the closure members 151 and 152 move smoothly and in the horizontal plane as they are displaced relative to the wagon body 50 in response to the movement imparted to the actuator rods 177 by the hydraulic cylinders 176.

It should be appreciated that the hydraulic circuitry can be designed to provide independent or synchronized movement of the closure members depending on the specific needs of the end user, and the unique closure arrangement allows the wagon body to be built very low to the ground while providing unobstructed dumping of the wagon contents when the closure members are in their fully extended position. The elongated beams, closure members and dump box outlet are dimensioned so that when the cylinders are fully retracted, the outlet 58 is sealed and any material introduced through the opening 52 will be retained in the bin 51. The cylinders conversely can be actuated to partially extend the closure members away from the wagon body 50 to provide limited or small volume dumping of the contents, or they can be fully extended as described, supra.

Having thereby disclosed the subject matter of this invention, it should be obvious that many modifications, substitutions and variations of the invention are possible in light of the above teachings. It is, therefore, to be understood that the invention may be practiced other than as specifically described and should be limited only by the breadth and scope of the appended claims.

I claim:

1. A gravity dumping utility wagon having an open wagon body mounted on a framework which is comprised of a plurality of horizontally disposed, elongated beams, said framework being supported by a plurality of wheels, comprising:

a plurality of closure members slideably disposed in a horizontal plane below said framework, said closure members being operatively connected to a means for horizontally opening and closing said closure members; said opening and closing including a plurality of hydraulic cylinders fluidly connected to a source of hydraulic fluid and having actuating rods for reciprocation mounted therein extending from one end of said cylinders; said plurality of hydraulic cylinders being disposed in opposite pairs such that one end of each cylinder is attached to said framework while each said actuating rod is attached to a portion of a closure member;

a plurality of substantially equa-length axles, and a pivotal means for pivotally rotating a front axle of said plurality of axles in perpendicular, horizontal and vertical planes; said pivotal means comprising:

a first rectangular plate, horizontally disposed in the front of said wagon, and secured beneath said horizontally disposed beams;

a second rectangular plate including a plurality of downwardly disposed apertured flanges positioned at its forward and rearward ends, said apertured flanges including a pivot pin aperture disposed in axial alignment between said flanges; said second plate further comprising a plurality of downwardly disposed stabilizing flanges positioned at its sides;

securing means for rotatably securing said second plate beneath said first plate, said securing means comprising a vertical journal post secured at the midpoint of said second plate, a journal aperture disposed in the center of said first plate and a means for securing said journal post within said journal aperture; and a vertical pivot means for pivotally securing said second rectangular plate to said front axle; said vertical pivot means comprising:

a plurality of bearing flanges disposed at the midpoint of said front axle, on the forward and rearward sides thereof, and including bearing apertures centrally disposed above said front axle and in corresponding axle alignment between said bearing flanges;

a plurality of cylindrcial pivot bearings, a first pivot being disposed on the forward side of said forward bearing flange, a second pivot bearing disposed at the rearward side of said rearward bearing flange, said first and second bearings disposed in axial alignment with said bearing apertures; and a pivot pin pivotally secured through said pivot pin apertures, said bearing apertures and said pivot bearings.

* * * * *